P. R. JANNEY.
CULTIVATOR.
APPLICATION FILED MAR. 1, 1917. RENEWED SEPT. 16, 1919.
1,327,828.
Patented Jan. 13, 1920.
3 SHEETS—SHEET 1.
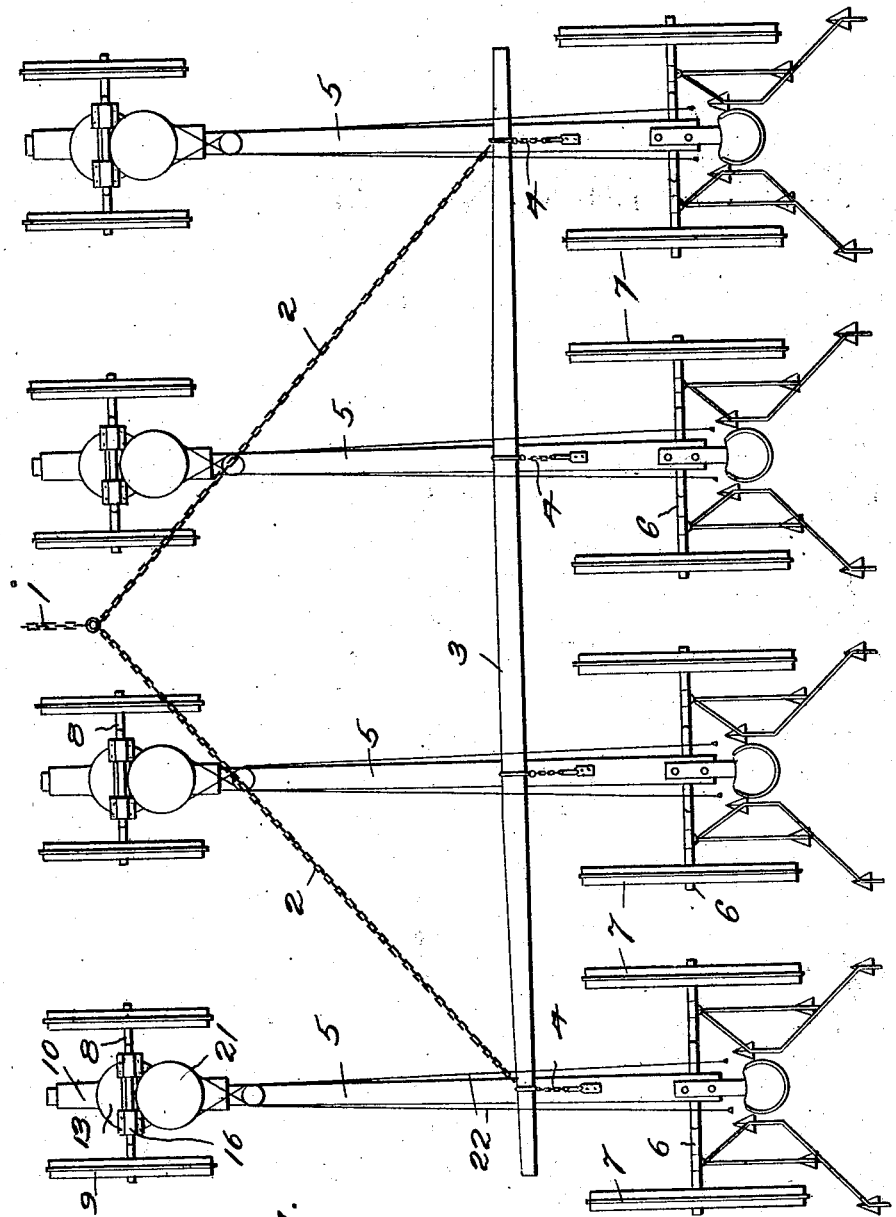

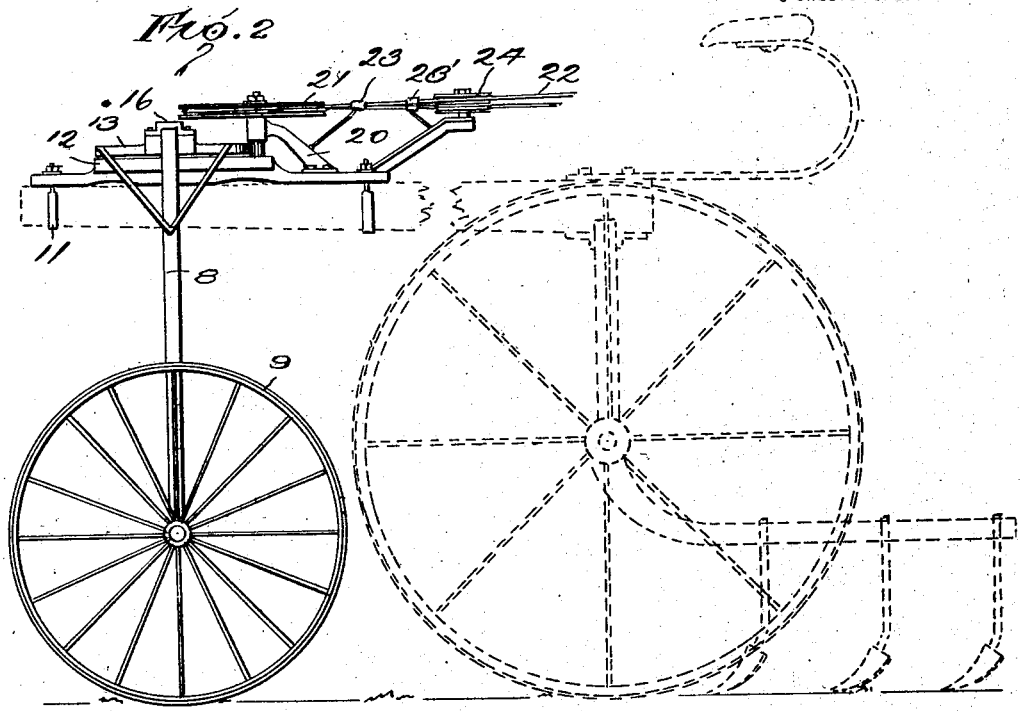
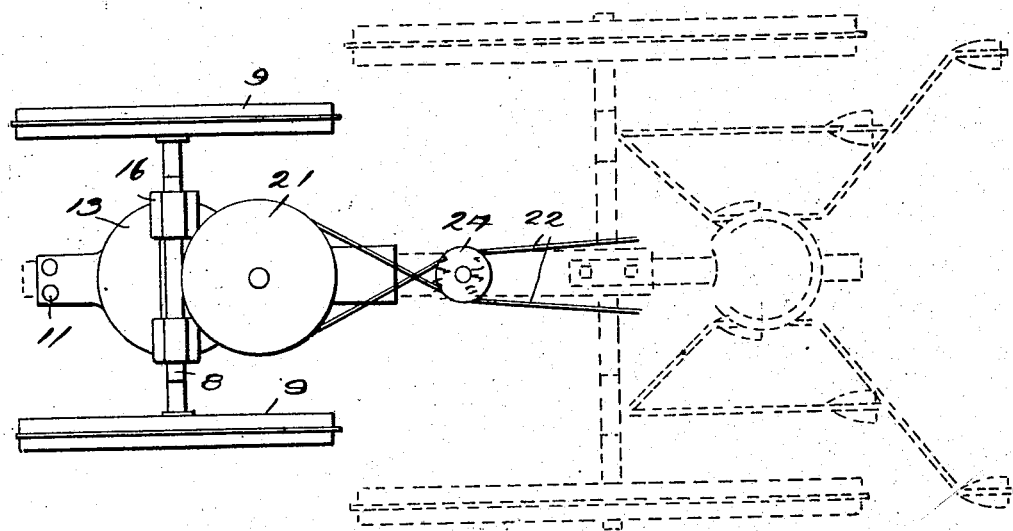

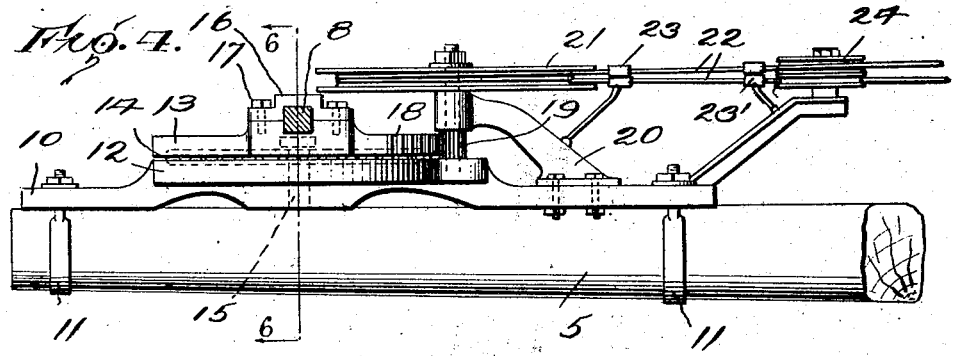
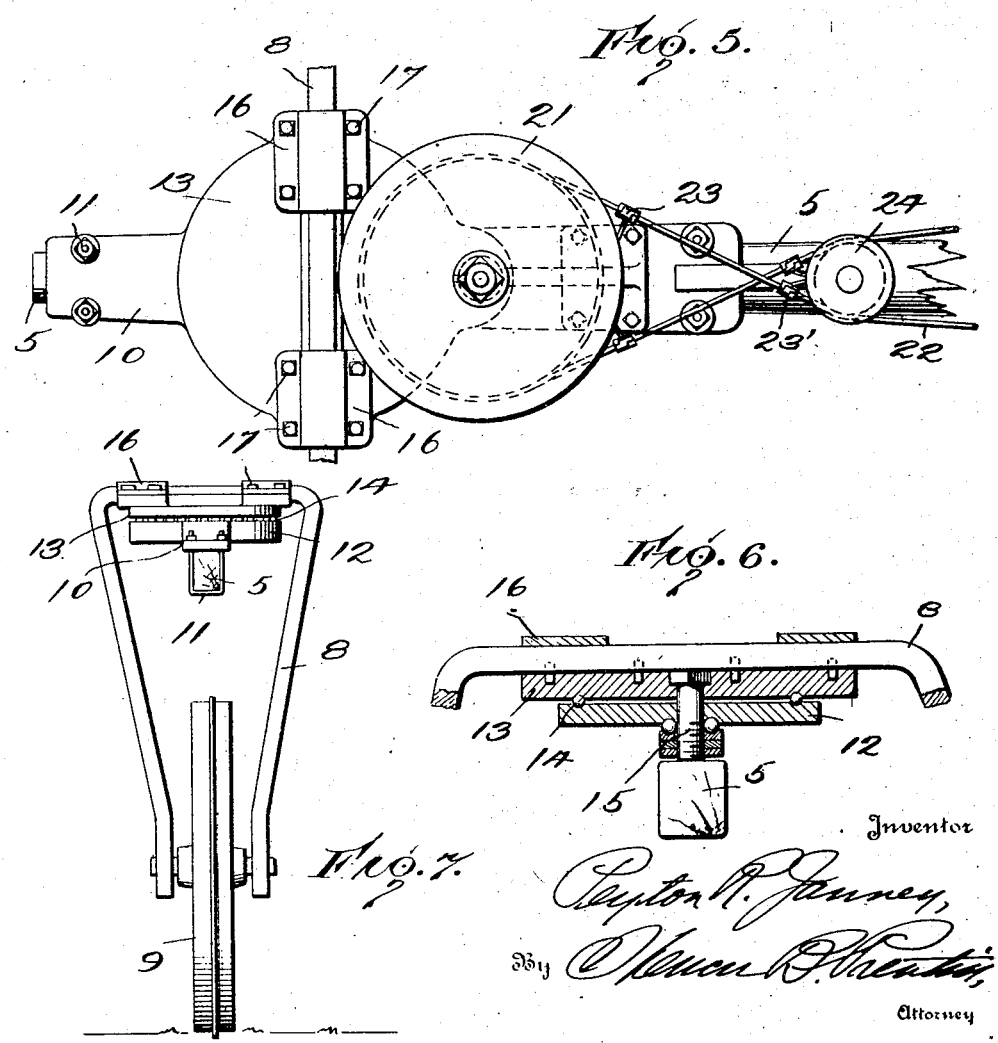

UNITED STATES PATENT OFFICE.

PEYTON R. JANNEY, OF DETROIT, MICHIGAN.

CULTIVATOR.

1,327,828. Specification of Letters Patent. Patented Jan. 13, 1920.

Application filed March 1, 1917, Serial No. 151,805. Renewed September 16, 1919. Serial No. 324,222.

*To all whom it may concern:*

Be it known that I, PEYTON R. JANNEY, a citizen of the United States, residing at Detroit, in the county of Wayne and State of Michigan, have invented new and useful Improvements in Cultivators, of which the following is a specification.

This invention relates to gang cultivators and gang plows in general and has to do in particular with the mechanism to be used in steering the individual units. One object of the invention is to provide a gang pull for cultivators in which the cultivator units are provided with mechanism making possible the control of each unit by the operator directing the same.

A further object of the invention is to provide a gang cultivator in which the cultivator units may be operated along the line parallel to but to one side of the direction taken by the tractor unit which may be used in pulling the gang.

A further object of the invention is to provide a cultivator which may be operated in a line parallel to but to one side of the direction taken by the tractor which may be used to pull the cultivator.

A further object of the invention is to provide a novel wheeled cultivator which may be steered by an auxiliary wheeled attachment under the control of the operator of the cultivator.

Another object of the invention is to provide an attachment for cultivator tongues which may be readily attached to the tongue of any cultivator, binder or plow, of present day use and which may be controlled from the seat of the cultivator or other implement to which a steering control mechanism may be attached.

Further features of the invention will be described in the following specification and claims and illustrated in the accompanying drawing in which—

Figure 1 represents a view of a gang cultivator embodying the use of the separately controlled cultivator units.

Fig. 2 represents a side view of one of the cultivator units.

Fig. 3 represents a top plan view of one of the cultivator units illustrated in Fig. 2.

Fig. 4 represents an enlarged view from the side of the mechanism used for steering the gang unit;

Fig. 5 represents an enlarged plan view of the same;

Fig. 6 represents a vertical section taken along the line 6—6 of Fig. 4;

Fig. 7 represents a modification of the steering device illustrating the use of a single wheel.

Like numerals refer to like parts throughout the figures of the drawings.

Referring to Fig. 1, 1 represents the connecting means from a tractor element used to pull the gang cultivator. 2 represents the divisions extending from 1 and being connected to a cross draw bar 3 to which the cultivator units of the gang are fastened by means of chains 4. It will be observed that the bar 3 extends across the tongues 5 of a plurality of cultivator units. The chains 4 are fastened to the cross-bar 3 and extend from the latter to the bolt in the tongue used for pivotally mounting the usual double-tree. Each chain should be of sufficient length, from six to fifteen inches, to permit movement of the tongue relative to the cross-bar as will be further described. The cultivator units are provided with the usual rear axle 6 and wheels 7. The axle should be provided with a substantial arch as is customary in cultivators used for corn. The tongue 5 extends forward substantially horizontally from the crest of the arch of the rear axle and is provided with the forward wheeled structure having the arched axle 8 and wheels 9. Extending rearwardly from the front end of the tongue 5 and along the top of the same is a turntable base 10 which is substantially the width of the tongue at either end of the base and is firmly fastened to the same by means of the clamping U-bolt members 11. Adjacent the forward end of the base 10 that member is broadened out to provide a substantially circular base for the reception of the rotatable parts to be mounted above it. This broadened portion of the base is indicated by the numeral 12. Mounted above the enlarged portion 12 is a rotatable table 13 provided with suitable ball-bearings or roller-bearings 14. A king bolt 15 extends through the table 13 and is fastened on the under surface of the base 10. Extending laterally across the top of the table 13 and substantially over the center thereof is the upper arched portion of the front axle member 8. This portion of the member 8 is clamped to and firmly secured on the table 13 by means of the yokes 16 and their respective fastening bolts 17. On the rear edge of the table 13 there is provided the gear teeth 18 which are adapted to be engaged by the teeth of the pinion gear 19 as will be described. Extending forwardly from the base 10 and from the rear part thereof is a bracket member 20 arranged to provide an upper bearing for the pinion gear 19 and a support for a control wheel 21 which is mounted above the bracket 20. The lowermost end of the pinion gear has its bearing support in the base 10 and the wheel 21 is rigidly keyed to the other end of the shaft. A control rope or operating cable 22 is fastened about the wheel 21 and extends through guide eyelets 23 on either side thereof and rearwardly therefrom through eyelets 23' and to either side of the spacing wheel 24. The control ropes 22 extend back to the rear portion of the cultivator unit so as to be readily accessible to the operator.

The control of the structure and management of the cultivator unit will be understood from the following explanation. The operator of the cultivator, if desiring to guide the machine to the right will pull on the proper rope 22 to turn the wheel 21 to the left. The pinion gear 19 being in mesh with the teeth 18 and rigidly keyed to the wheel 21 will operate to turn the table 13 to the right or clock-wise, thus rotating the table on the base 10 to steer the wheels 9.

Referring to the modification illustrated in Fig. 7 it will be noted that the operating mechanism illustrated is substantially the same but that there is one wheel instead of two. In this form the axle 8 extends downwardly to provide a forked member having at its lowermost ends the axle bearings for a wheel which is mounted thereon.

From the foregoing description and the accompanying drawings it will be clear that this invention provides an unusually adaptable type of structure of gang cultivator and also a simple and inexpensive form of front wheel and steering structure therefor. Changes in the relative location of the parts, relative proportion of the same and changes in the material to be used may be made without departing from the scope of the invention.

What I claim is:—

1. The combination with a common draw bar of a plurality of wheeled implement units, a forwardly extending tongue for each unit, a wheeled steering structure swivelly mounted near the forward end of each tongue, control means for steering each of said wheeled steering structures, and a coupling member connected to said tongue at a point to the rear of said wheeled steering structure and connected to said draw bar and adapted to permit movement of said tongue relative to said draw bar.

2. The combination with a common draw bar of a plurality of wheeled implement units, a forwardly extending tongue for each unit, a wheeled steering structure swivelly mounted near the forward end of each tongue, control means for steering each of said wheeled steering structures, and a flexible coupling member connected to said tongue at a point to the rear of said wheeled steering structure and connected to said draw bar and adapted to permit lateral movement of said tongue relative to said draw bar.

3. The combination with a common draw bar of a plurality of wheeled implement units, a forwardly extending tongue for each unit, a wheeled steering structure swivelly mounted near the forward end of each tongue, control means for steering each of said wheeled steering structures, a coupling member connected to said tongue at a point to the rear of said wheeled steering structure and connected to said draw bar and adapted to permit movement of said tongue relative to said draw bar, and separate control means for steering each of said wheeled steering structures.

4. The combination with a common draw bar of a plurality of wheeled implement units, a forwardly extending tongue for each unit, a wheeled steering structure swivelly mounted near the forward end of each tongue, control means for steering each of said wheeled steering structures, a flexible coupling member for each tongue connected to the same at a point to the rear of said wheeled steering structure and connected to said draw bar and adapted to permit lateral movement of said tongue relative to said draw bar, and separate control means for steering each of said wheeled steering structures.

5. The combination of a plurality of wheeled implement units, a forwardly extending tongue for each unit, a wheeled steering structure for each tongue swivelly mounted adjacent the forward end thereof, individual control means for steering each wheeled steering structure, a common draw bar extending across the tongues of each of said units, and a separate flexible connection between said bar and each of said tongues.

In testimony whereof I have hereunto set my hand.

PEYTON R. JANNEY.